(12) United States Patent
Chung et al.

(10) Patent No.: US 10,379,280 B2
(45) Date of Patent: Aug. 13, 2019

(54) DIRECTIONAL BACKLIGHT UNIT AND 3D IMAGE DISPLAY DEVICE HAVING THE SAME

(71) Applicant: SAMSUNG ELECTRONICS CO., LTD., Suwon-si (KR)

(72) Inventors: Jaeseung Chung, Suwon-si (KR); Bongsu Shin, Seoul (KR); Joonyong Park, Suwon-si (KR); Sunghoon Lee, Seoul (KR); Dongouk Kim, Pyeongtaek-si (KR); Hyunjoon Kim, Seoul (KR); Jihyun Bae, Seoul (KR); Dongsik Shim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 15/414,015

(22) Filed: Jan. 24, 2017

(65) Prior Publication Data
US 2018/0059303 A1 Mar. 1, 2018

(30) Foreign Application Priority Data
Aug. 30, 2016 (KR) .......... 10-2016-0110830

(51) Int. Cl.
*F21V 8/00* (2006.01)
*G02B 5/18* (2006.01)
*G02B 5/20* (2006.01)
*G02B 27/10* (2006.01)

(52) U.S. Cl.
CPC .......... *G02B 6/005* (2013.01); *G02B 6/0061* (2013.01); *G02B 6/0068* (2013.01); *G02B 5/1819* (2013.01); *G02B 5/201* (2013.01); *G02B 27/1006* (2013.01)

(58) Field of Classification Search
None
See application file for complete search history.

(56) References Cited

U.S. PATENT DOCUMENTS

| 7,759,861 | B2 | 7/2010 | Fujimoto et al. |
| 9,128,226 | B2 | 9/2015 | Fattal et al. |
| 9,235,057 | B2 | 1/2016 | Robinson et al. |
| 2014/0300947 | A1 | 10/2014 | Fattal et al. |
| 2014/0300960 | A1 | 10/2014 | Santori et al. |
| 2015/0138486 | A1* | 5/2015 | Lee .......... G02F 1/29 349/62 |
| 2016/0033706 | A1 | 2/2016 | Fattal et al. |
| 2017/0299794 | A1* | 10/2017 | Fattal ........ G02B 6/34 |

FOREIGN PATENT DOCUMENTS

| JP | 4410123 B2 | 2/2010 |
| KR | 1020150057743 A | 5/2015 |

* cited by examiner

*Primary Examiner* — Britt D Hanley
(74) *Attorney, Agent, or Firm* — Sughrue Mion PLLC

(57) ABSTRACT

A directional backlight unit and a three-dimensional (3D) image display device including the directional backlight unit are provided. The directional backlight unit includes: a light guide plate, a light source configured to irradiate an incident surface of the light guide plate with a plurality of color lights, and a grating that includes a sub-grating configured to react to all of the plurality of color lights. The directional backlight unit may further include a color filter that corresponds to a plurality of color lights emitted from each sub-grating.

19 Claims, 12 Drawing Sheets

DIRECTIONAL BACKLIGHT UNIT AND 3D IMAGE DISPLAY DEVICE HAVING THE SAME

CROSS-REFERENCE TO RELATED APPLICATION

This application claims priority from Korean Patent Application No. 10-2016-0110830, filed on Aug. 30, 2016 in the Korean Intellectual Property Office, the disclosure of which is incorporated herein by reference in its entirety.

BACKGROUND

1. Field

Exemplary embodiments relate to directional backlight units, and three-dimensional (3D) image display devices having the same.

2. Description of the Related Art

Recently, many three-dimensional (3D) movies have been produced. Accordingly, many studies on techniques related to 3D image display devices have been conducted. A 3D image display device displays a 3D image based on the binocular parallax of the eyes. Currently commercialized 3D image display devices are based on the binocular parallax of the eyes. The 3D image display device provides a 3D effect to a viewer by respectively providing a left eye image and a right eye image that are captured at different times from each other to a left eye and a right eye of the viewer. The 3D image display device may be classified into a glass-type 3D image display device that requires the use of special glasses and a glass-free 3D image display device that does not require the use of glasses.

The glass-type 3D image display device uses a red-green glass method. In the case of televisions (TVs), two methods are typically used: a polarized glasses method and a liquid crystal shutter method. A glass-free 3D image display device may be classified into a barrier method type device and a lenticular method type device, according to its structure. Also, methods used by the glass-free 3D image display device may be classified into a multi-view rendering method, a volumetric method in which all information of a 3D space is included and displayed via voxels in a 3D space, an integral imaging method in which, after taking images focusing through lenses having compound eyes (e.g., housefly eyes) of an insect in various angles, the images are reversely displayed, a holographic method, and a directional backlight unit method, according to the method of realizing an image.

In the directional backlight unit method, a 3D image may be realized by controlling an emission direction of light by using a grating. Light on a light guide plate is transmitted to the end of the light guide plate, and light uniformity is reduced because a relatively large amount of light is emitted at a front portion of the light guide plate and the amount of emitted light decreases toward a rear portion of the light guide plate.

SUMMARY

One or more exemplary embodiments provide a directional backlight unit with high brightness and light uniformity.

One or more exemplary embodiments also provide a 3D image display device that includes the directional backlight unit with high brightness and light uniformity.

According to an aspect of an exemplary embodiment, a directional backlight unit includes a light guide plate, a light source configured to radiate a plurality of color lights toward an incident surface of the light guide plate, a plurality of gratings configured to emit the plurality of color lights radiated toward the light guide plate, and a color filter comprising a plurality of color filter pixels that respectively correspond to the plurality of color lights emitted from the plurality of gratings, wherein each of the plurality of gratings includes a plurality of sub-gratings, and each of the plurality of sub-gratings is configured to react to the plurality of color lights.

The incident surface of the light guide plate may be formed only on one side of the light guide plate.

The light source may include a first light source configured to emit a first plurality of color lights and a second light source configured to emit a second plurality of color lights, and the incident surface of the light guide plate comprises a first incident surface on which the first plurality of color lights from the first light source are incident, and a second incident surface on which the second plurality of color lights from the second light source are incident.

The first incident surface may be formed on a first side of the light guide plate, and the second incident surface may be formed on a second side of the light guide plate which is opposite the first side of the light guide plate, and the first incident surface may be disposed to face the second incident surface.

The plurality of gratings may include a plurality of first gratings configured to emit the plurality of color lights in a first direction, and a plurality of second gratings configured to emit the plurality of color lights in a second direction, wherein the first gratings may be adjacent to the first incident surface, and the second gratings may be adjacent to the second incident surface.

The light guide plate may include two planar surfaces that face each other, two long-side surfaces that face each other and connect the two planar surfaces, and two short-side surfaces that face each other and connect the two planar surfaces, and the first and second incident surfaces may be respectively formed on the two short-side surfaces.

The light guide plate may include two planar surfaces that face each other, two long-side surfaces that face each other and connect the two planar surfaces, and two short-side surfaces that face each other and connect the two planar surfaces, and the first and second incident surfaces may be respectively formed on the two long-side surfaces.

Each of the plurality of gratings may have an identical sub-grating arrangement.

Each of the plurality of sub-gratings may have a substantially vertical grating orientation with respect to the plurality of color lights.

Each of the plurality of sub-gratings may have a substantially parallel grating orientation.

At least some of the plurality of sub-gratings may have at least one of a grating pitch, a grating width, and a grating duty cycle that is different from that of other sub-gratings.

The light source may radiate the plurality of color lights toward the incident surface at different incident angles.

Each of the plurality of sub-gratings may have a grating pattern which is configured to adjust respective emission angles of the plurality of color lights by adjusting a grating pitch.

The grating pattern may include any one of a linear grating, a curved grating, a pole-type grating, and a gradient grating.

The grating may include at least one of a high-molecular material, silicon nitride (SiN), and silicon oxide (SiO$_2$).

The directional backlight unit may satisfy the following formula:

$$N_{cfp} \leq N_{gu-i} * N_{sgu-i} * N_l$$

wherein $N_{cfp}$ is a total number of color filter pixels included in the color filter, $N_{gu-i}$ is a total number of the gratings, $N_{sgu-i}$ is a total number of the sub-gratings in the grating corresponding to index i, and $N_l$ is a number of wavelengths of the color lights emitted from the light source.

Positions of the plurality of color filter pixels may correspond to at least some of the plurality of color lights emitted from the plurality of gratings and the plurality of sub-gratings.

At least some of the plurality of sub-gratings may be adjacent to each other.

According to an aspect of another exemplary embodiment, a directional backlight unit includes a light guide plate, a light source configured to radiate each of a first light having a first wavelength and a second light having a second wavelength toward an incident surface of the light guide plate, a grating device having a grating orientation which is configured to react to both of the first light and the second light and comprising a plurality of gratings configured to emit the first light and the second light, and a color filter comprising a first color filter pixel configured to transmit the first light of the first wavelength and a second color filter pixel configured to transmit the second light of the second wavelength, wherein the total number of the lights transmitted by the color filter is less than the total number of lights emitted from the grating device.

According to an aspect of another exemplary embodiment, a 3D image display device includes a directional backlight unit including: a light guide plate; a light source configured to radiate a plurality of color lights toward an incident surface of the light guide plate; a plurality of gratings configured to emit the plurality of color lights radiated toward the light guide plate; and a color filter comprising a plurality of color filter pixels that respectively correspond to the plurality of color lights emitted from the plurality of gratings, and a display panel configured to form an image by using the plurality of color lights emitted from the directional backlight unit, wherein each of the plurality of gratings includes: a plurality of sub-gratings, and each of the plurality of sub-gratings is configured to react to the plurality of color lights.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
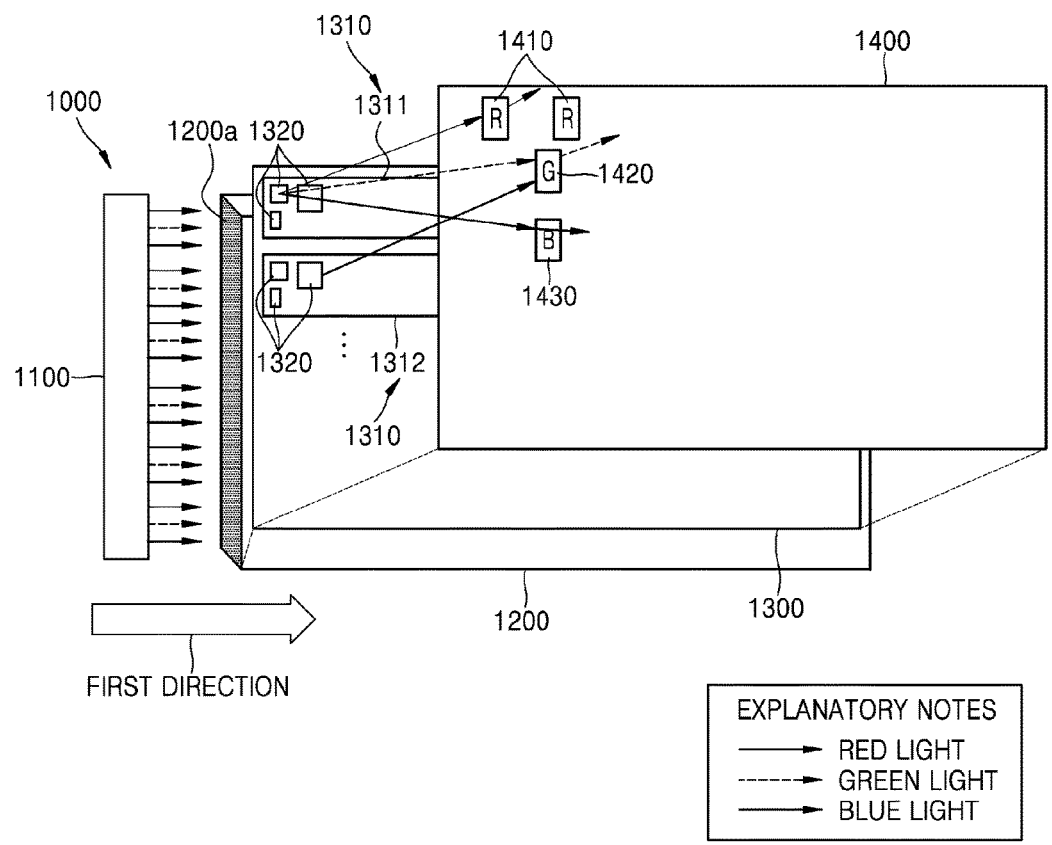
FIG. 1 is a perspective view of a directional backlight unit, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Like reference numerals refer to like elements throughout. In the drawings, the sizes of constituent elements may be exaggerated for clarity. It will be understood that, although the terms first, second, etc. may be used herein to describe various elements, these elements should not be limited by these terms. These terms are only used to distinguish one element from another.

As used herein, the singular forms "a", "an", and "the" are intended to include the plural forms as well, unless the context clearly indicates otherwise. In addition, it will be understood that when a unit is referred to as "comprising" another element, it may not exclude the other element but may further include the other element unless specifically indicated otherwise.

Directional backlight units and 3D image display devices having the same will now be described in detail according to exemplary embodiments, examples of which are illustrated in the accompanying drawings.

Figure 2:
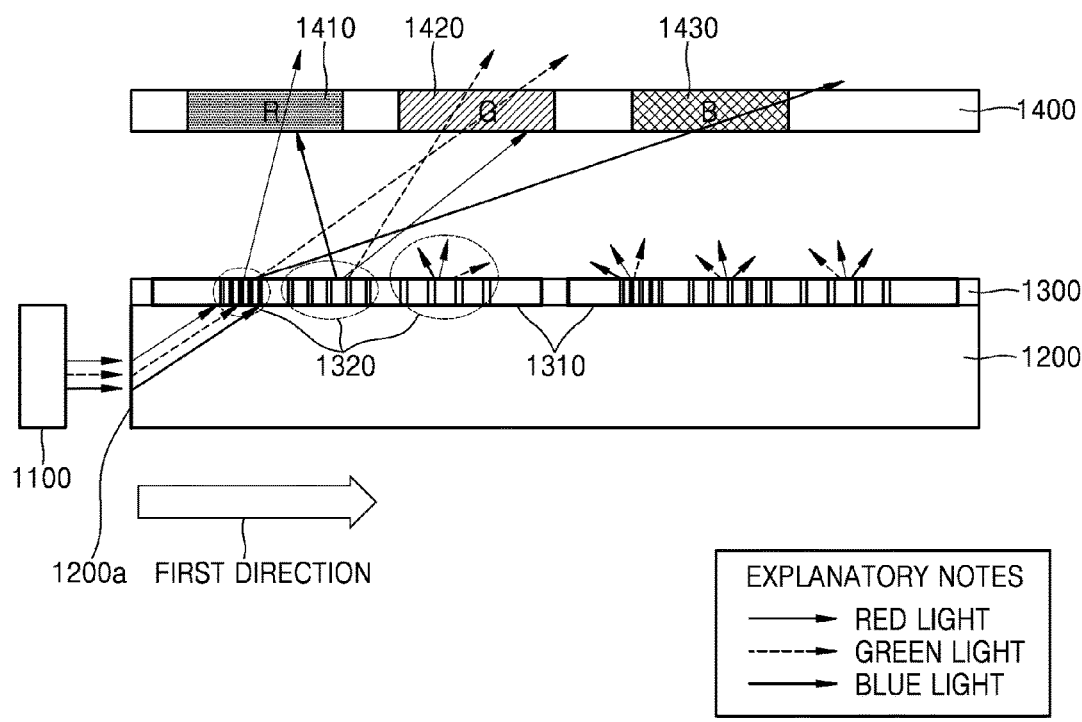
FIG. 2 is a schematic cross-sectional view of the directional backlight unit of FIG. 1.

FIG. 1 is a schematic perspective view of a directional backlight unit (also referred to herein as a "directional backlight device") 1000, according to an exemplary embodiment. FIG. 2 is a schematic cross-sectional view of the directional backlight unit 1000 of FIG. 1.

Referring to FIGS. 1 and 2, the directional backlight unit 1000 may include a light source 1100 that is configured to emit light, a light guide plate 1200 that is configured to guide the light emitted from the light source 1100, a grating device 1300 provided on the light guide plate 1200, and a color filter 1400.

The light source 1100 may be disposed on, for example, at least one side of the light guide plate 1200. The light source 1100 may emit a plurality of color lights. For example, the light source 1100 may include a light-emitting diode (LED) or a laser diode (LD). For example, a plurality of LEDs or LDs emitting lights of different wavelengths may be disposed on at least one side of the light guide plate 1200. However, the light source 1100 according to the current exemplary embodiment is not limited thereto, that is, the light source 1100 may include various lighting devices emitting lights of a plurality of wavelengths.

Referring to FIG. 1, a plurality of color lights may be radiated toward a first incident surface 1200a of the light guide plate 1200 from the light source 1100. For example, the light source 1100 may include a first light source emitting light of a first wavelength band, a second light source emitting light of a second wavelength band, and a third light source emitting light of a third wavelength band. For example, a first light source may emit a blue light, a second light source may emit a green light, and a third light source may emit a red light. For example, all of the first, second, and third light sources may be disposed on one side of the light guide plate 1200, and may irradiate the first incident surface 1200a with lights of the first, second, and third wavelength bands, respectively. As illustrated in FIG. 1, the first incident surface 1200a may be irradiated with the lights of the first, second, and third wavelength bands in a first direction. Incident angles of the lights of the first, second, and third wavelength bands incident on the light guide plate 1200 may be equal to or different from each other. Detailed descriptions thereof will be described below.

The light guide plate 1200 may include two planar surfaces that face each other and a plurality of side surfaces that face each other and connect the two planar surfaces. For example, a plurality of side surfaces may include two long-side surfaces that face each other and two short-side surfaces that face each other. For example, the light guide plate 1200 may have a cubic shape or a bent rectangular parallelepiped shape. However, the light guide plate 1200 is not limited thereto. For example, the light guide plate 1200 may have a columnar shape or an elliptical columnar shape, and may include a plurality of side surfaces that may be within a range of a length of an arc that is approximate to a straight line.

The light guide plate 1200 may include the first incident surface 1200a. The first incident surface 1200a is a side surface that is irradiated by the light source 1100 with a plurality of color lights. The first incident surface 1200a may be located on a short-side surface or a long-side surface of the light guide plate 1200. The light guide plate 1200 may guide the plurality of color lights from the light source 1100 through internal total reflection.

Referring to FIG. 1, the light guide plate 1200 may include a single first incident surface 1200a, but the exemplary embodiments are not limited thereto. When the light guide plate 1200 includes a plurality of incident surfaces, the plurality of incident surfaces may be respectively located on short-side surfaces of light guide plate 1200 that face each other, or may be respectively located on long-side surfaces of the light guide plate 1200 that face each other. Detailed descriptions thereof will be described below with reference to FIG. 7.

Referring to FIG. 1, the grating device 1300 may be formed on a front side of the light guide plate 1200. For example, the grating device 1300 may be formed on one planar surface of the light guide plate 1200. A plurality of gratings 1310 may be arranged in the grating device 1300 in a two-dimensional (2D) matrix type.

The grating device 1300 may include the plurality of gratings 1310 and a plurality of sub-gratings 1320 respectively formed in each of the plurality of gratings 1310. The plurality of sub-gratings 1320 respectively included in each of the plurality of gratings 1310 may have the same arrangement as that of the plurality of gratings 1310, but the arrangement is not limited thereto.

The plurality of sub-gratings 1320 may have a grating pattern that is configured for adjusting emission directions of a plurality of color lights. For example, the plurality of sub-gratings 1320 may have a grating pattern that is configured for adjusting an emission direction of a color light according to at least one of incident angles and wavelengths of a plurality of color lights incident on the light guide plate 1200. For example, an incident angle of a color light with respect to the first incident surface 1200 may correspond to an emission direction of a color light emitted from the grating device 1300.

According to the present exemplary embodiment, the plurality of sub-gratings 1320 may have an interaction with color lights of all wavelengths. For example, the plurality of sub-gratings 1320 may have a grating orientation for an interaction with color lights of all wavelengths. For example, sub-gratings 1320 having a vertical grating orientation for an incident direction of light may have an interaction with lights of all wavelengths (i.e., may grate color lights of all wavelengths). However, a direction of the grating orientation of the sub-gratings 1320 for the interaction with the lights of all wavelengths is not limited to a vertical direction of the incident direction of light. For example, the sub-gratings 1320 having a grating orientation within a predetermined angle range based on a vertical direction may interact with all color lights of various wavelengths. According to the simulation result, the predetermined angle range may be, e.g., ±47° based on a vertical direction.

Since the plurality of sub-gratings 1320 according to the present exemplary embodiment react to color lights of all wavelengths, the grating device 1300 may uniformly form the plurality of sub-gratings 1320 on the entire area. Therefore, a brightness and a uniformity of the directional backlight unit 1000 may be improved. However, since the plurality of sub-gratings 1320 do not have selectivity according to a wavelength of a color light, another component that is configured to determine whether to transmit an emitted light according to a wavelength of the emitted light, such as, for example, a color filter, is required.

The plurality of sub-gratings 1320 may have various patterns, pitches, refractivity, and duty cycles of gratings. For example, the plurality of sub-gratings 1320 may have various grating characteristics that are based on the assumption that the plurality of sub-gratings 1320 have a grating orientation that facilitates an ability to react to all of a plurality of color lights guided to an incident surface. Since the plurality of sub-gratings 1320 have various grating characteristics, each of the plurality of color lights may be emitted in a specific direction. As a result, a correspondence relation may be established between incident angles of a plurality of color lights incident on the light guide plate 1200 and emission angles of a plurality of color lights emitted from the grating device 1300.

The grating device 1300 may provide a view by emitting light in different directions according to grating patterns and arrangements of the plurality of gratings 1310 and the plurality of sub-gratings 1320. Here, a view may denote a single image viewed on a single eye of a viewer. However, the view is not limited thereto, and in this aspect, it is possible that images that correspond to more than two views are displayed with respect to a single eye of the viewer. The grating device 1300 may control an emission direction of light, and may display a three-dimensional (3D) image when views are provided to a viewer, the views being different from each other according to the emission direction of light. A plurality of views, for example, 36 views, 48 views, or 96 views may be provided according to the number of the plurality of gratings 1310. Each of the plurality of sub-gratings 1320 included in the plurality of gratings 1310 may correspond to one pixel, respectively.

The color filter 1400 may include a plurality of sub color filter pixels 1410, 1420, and 1430. Since the grating device 1300 has no selectivity according to a wavelength of light, the color filter 1400 corresponds to a component that is configured to determine whether to transmit emitted light according to a wavelength of light, the component thereby providing a capability to complement the selectivity. The color filter 1400 may include the plurality of sub color filter pixels 1410, 1420, and 1430 which respectively correspond to types of wavelengths of color lights incident on the light guide plate 1200. For example, when the light source 1100 emits a red light, a green light, and a blue light, the color filter 1400 may include a red pixel 1410 that corresponds to a red light, a green pixel 1420 that corresponds to a green light, and a blue pixel 1430 that corresponds to a blue light.

Since the color filter 1400 filters color lights emitted from the grating device 1300, positions of the sub color filter pixels 1410, 1420, and 1430 may be relatively determined from a relationship with the grating device 1300. The plurality of sub-gratings 1320 according to the present exemplary embodiment interact with all of a plurality of color lights, and thus, the sub-gratings 1320 may emit three color lights, for example, a red light, a blue light, and a green light at different angles, respectively.

The total number of lights emitted from the grating device 1300 may be expressed as $N_{gu-i}*N_{sgu-i}*N_l$. In the above expression, $N_{gu-i}$ indicates the total number of the gratings 1310, $N_{sgu-i}$ indicates the number of the sub-gratings 1320 corresponding to index i, and $N_l$ indicates the number of wavelengths of color light emitted from the light source 1100. For example, when the light source 1100 emits three of a red light, a blue light, and a green light, $N_l$ may be equal to 3.

Figure 3:
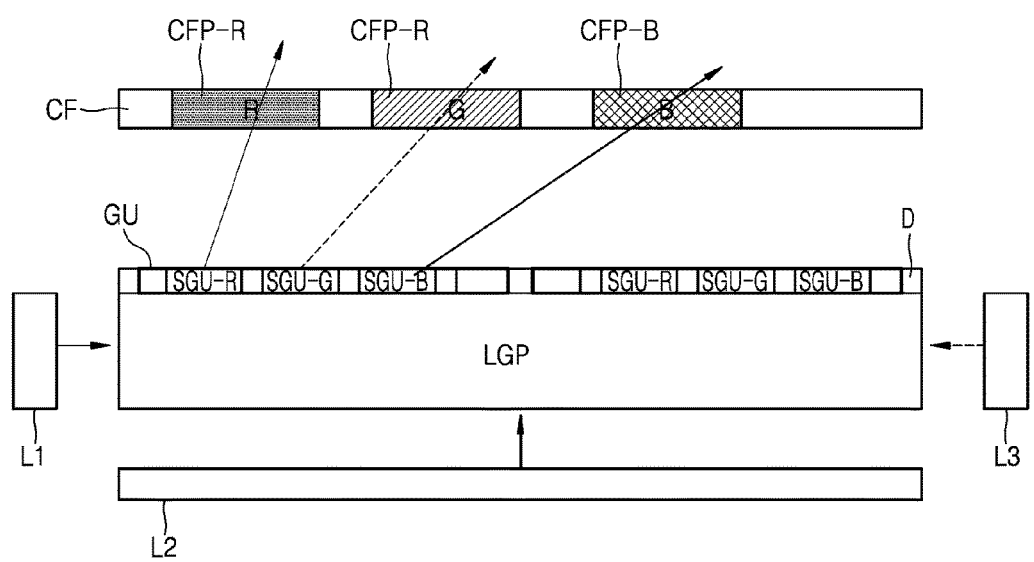
FIG. 3 is a schematic cross-sectional view of a related art directional backlight unit.

Referring to FIG. 3, since one of sub-gratings SGU-R, SGU-G, and SBU-B corresponds to only one wavelength in a related art grating device D, the grating device D emits a total number of $N_{gu-i}*N_{sgu-i}$ beams, and a color filter CF may include color filter pixels CFP-R, CFP-G, and CFP-B to correspond to each of the total number of $N_{gu-i}*N_{sgu-i}$ beams.

However, the grating device 1300 according to the present exemplary embodiment may further emit $N_l$ times more beams than the grating device D of FIG. 3. Therefore, the number of beams emitted from the grating device 1300 may be greater than the number of beams required for generating a view. For example, the number of views finally generated by a directional backlight unit may be equal to 36, 48, or 96, and thus, the number of beams emitted from the directional backlight unit 1000 may correspond to the number of views. The color filter 1400 may filter the beams emitted from the directional backlight unit 1000 such that the number of the beams emitted from the color filter 1400 is the same as or less than the total number of the beams emitted from the grating device 1300. Therefore, the color filter 1400 according to the present exemplary embodiment may satisfy Formula 1 as expressed below:

$$N_{cfp} \leq N_{gu-i}*N_{sgu-i}*N_l \quad \text{[Formula 1]}$$

In Formula 1, $N_{cfp}$ indicates the total number of filter pixels included in the color filter 1400, $N_{gu-i}$ indicates the total number of the gratings 1310, $N_{sgu-i}$ indicates the number of the sub-gratings 1320 corresponding to index i, and $N_l$ indicates the number of wavelengths of color lights emitted from the light source 1100.

The color filter 1400 that satisfies Formula 1 may transmit some of the beams emitted from the grating device 1300, and may not transmit other beams. Referring to FIG. 2, each of the sub-gratings 1320 of the grating device 1300 emits three beams by interacting with all of a red light, a blue light, and a green light. However, the sub color filter pixels 1410, 1420, and 1430 may transmit some of the beams or may not transmit other beams. Therefore, while the directional backlight unit 1000 according to the present exemplary embodiment improves its brightness and uniformity as the sub-gratings 1320 corresponds to color lights of all wavelengths, the color filter 1400 may select whether to transmit light according to a wavelength.

Types, the number, and positions of the plurality of sub color filter pixels 1410, 1420, and 1430 formed in the color filter 1400 may be determined after positions of the gratings 1310 and the sub-gratings 1320 of the grating device 1300 are determined. For example, types, the number, and positions of the plurality of sub color filter pixels 1410, 1420, and 1430 formed in the color filter 1400 may be determined by a suitable simulation and a design of an algorithm. For example, types, the number, and positions of the plurality of sub color filter pixels 1410, 1420, and 1430 formed in the color filter 1400 may be determined by determining the number of views finally generated by a directional backlight unit to be equal to one of 36, 48, and 96. However, types, the number, and positions of the plurality of sub color filter pixels 1410, 1420, and 1430 are not limited thereto and may vary according to a design intention.

FIG. 3 is a schematic cross-sectional view of a related art directional backlight unit. Referring to FIG. 3, each of the sub-gratings SGU-R, SGU-G, and SBU-B included in the related art directional backlight unit corresponds to only a specific wavelength, and each of the sub-gratings SGU-R, SGU-G, and SBU-B has a grating pattern of a specific orientation in order to have wavelength selectivity. For example, the sub-grating SGU-R may have a grating orientation that reacts to only a red light, the sub-grating SGU-B may have a grating orientation that reacts to only a blue light, and the sub-grating SGU-G may have a grating orientation that reacts to only a green light. As described above, the grating orientation relates to an incident direction of an incident light, and thus, the related art directional backlight unit is required to have a red light, a blue light, and a green light in different incident directions. For example, a red light source L1, a green light source L2, and a blue light source L3 irradiate incident surfaces of the light guide plate LGP with color lights, respectively. Regarding characteristics of the light guide plate LGP, emitting a much larger amount of light from a location close to each of the light sources L1, L2, and L3 may occur, and therefore, uniformity of a directional backlight unit may not be ensured.

Figure 4:
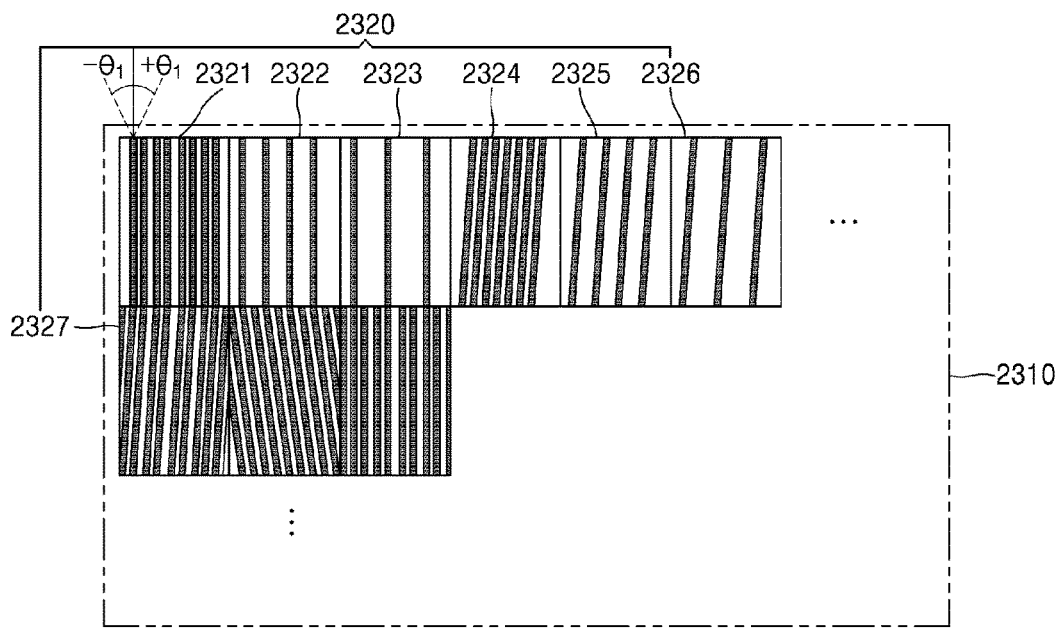
FIG. 4 is a schematic cross-sectional view of a grating, according to an exemplary embodiment.

FIG. 4 is a schematic cross-sectional view of a grating 2310, according to an exemplary embodiment. Referring to FIG. 4, the grating 2310 may include a plurality of sub-gratings 2320 that are adjacent to each other.

The plurality of sub-gratings 2320, as described above, may have a vertical grating orientation for an incident direction (first direction) of a plurality of color lights, or may have a grating orientation within a predetermined angle±θ₁ based on a vertical direction. For example, the predetermined angle θ₁ may be equal to 47 degrees. However, the predetermined angle θ₁ is not limited to the example described above and may be determined by confirming an angle near a boundary in which a grating does not react to the angle based on a simulation.

Referring to FIG. 4, the angle θ₁ of each of the sub-gratings 2321, 2322, and 2323 may be equal to zero (0) degrees, grating orientations of the sub-gratings 2321, 2322, and 2323 may be parallel to each other, and grating pitches of the sub-gratings 2321, 2322, and 2323 may be different from each other. The angle θ₁ of each of sub-grating 2324, 2325, and 2326 may be a predetermined angle that is different from 0 degrees, grating orientations of the sub-grating 2324, 2325, and 2326 may be parallel to each other, and grating pitches of the sub-grating 2324, 2325, and 2326 may be different from each other. A sub-grating 2327 may have a grating orientation having an angle that is different from that of the sub-grating 2324.

The sub-gratings 2320 according to the present exemplary embodiment may be adjacent to each other, and a brightness and a light uniformity of a directional backlight unit may be improved as an area of the sub-gratings 2320 increases as compared to the grating 2310.

Grating pitches of the sub-gratings 2321, 2322, and 2323 may be different from each other. For example, grating pitches of the sub-gratings 2321, 2322, and 2323 may be sequentially greater than each other (i.e., the grating pitch of sub-grating 2323 may be greater than the grating pitch of sub-grating 2322, which is greater than the grating pitch of sub-grating 2321). However, grating pitches, which are configured for adjusting angles of a plurality of emitted color lights, are not limited to the example described above and may vary as needed.

Figure 5:
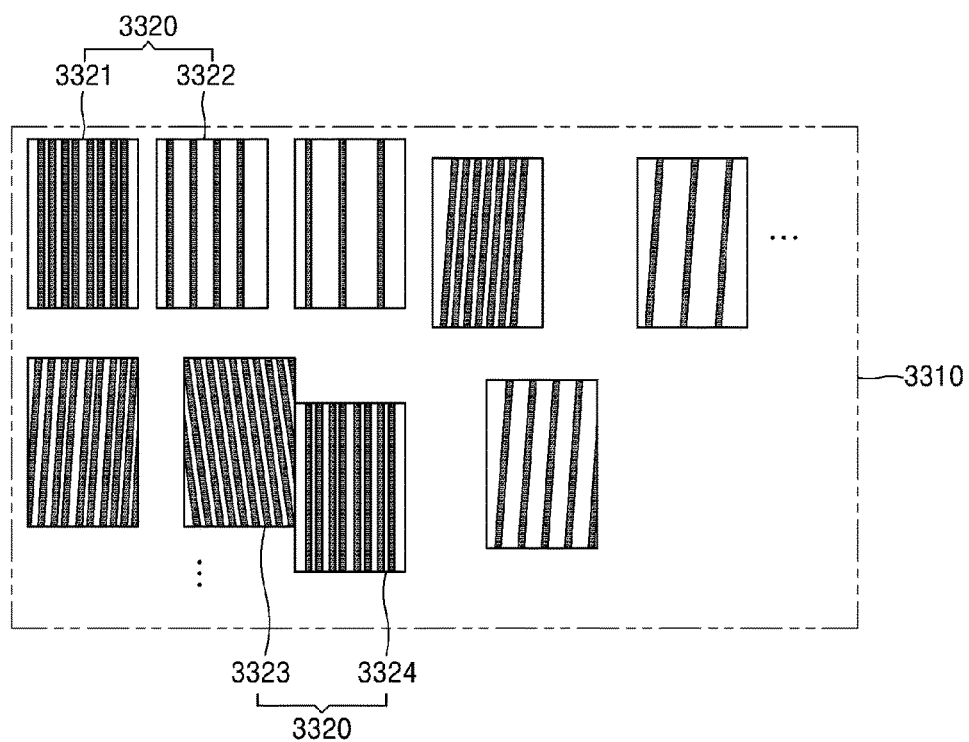
FIG. 5 is a schematic cross-sectional view of a grating, according to another exemplary embodiment.

FIG. 5 is a schematic cross-sectional view of a grating 3310, according to another exemplary embodiment. Referring to FIG. 5, some sub-gratings 3321 and 3322 of a plurality of sub-gratings 3320 may be spaced apart from each other. Some sub-gratings 3323 and 3324 may contact each other.

The plurality of sub-gratings 3320, as described above, may have a vertical grating orientation for an incident direction (first direction) of a plurality of color lights, or may have a grating orientation within a predetermined angle±θ₁ based on a vertical direction. The plurality of sub-gratings 3320 may have various grating pitches, grating patterns, and duty cycles of gratings.

Figure 6:
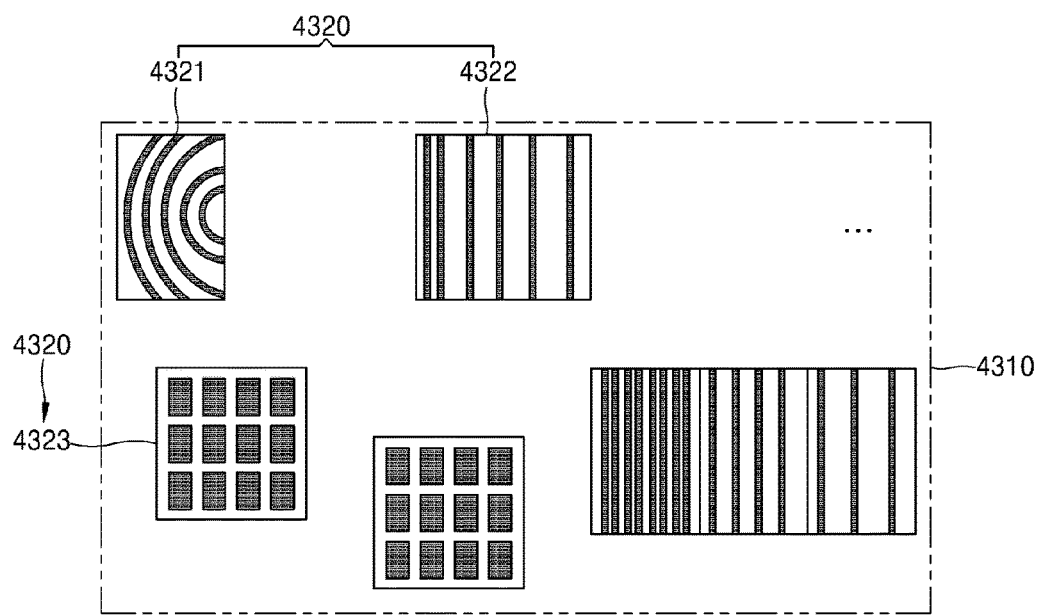
FIG. 6 is a schematic cross-sectional view of a grating, according to another exemplary embodiment.

FIG. 6 is a schematic cross-sectional view of a grating 4310, according to another exemplary embodiment.

Referring to FIG. 6, the grating 4310 may include various sub-gratings 4320. For example, the sub-gratings 4320 may include a sub-grating 4321 having a grating pattern of a curved shape, a sub-grating 4322 having a gradient pattern in which a grating pitch gradually changes, and a sub-grating 4323 having a 2D grating pattern.

The sub-grating 4323 having a 2D grating pattern may have a grating pattern in which pole-type grating posts are two-dimensionally arranged. The grating posts may have any of a columnar shape, an elliptical columnar, a regular hexahedron shape, a rectangular parallelepiped shape, or a tetrahedral shape.

Figure 7:
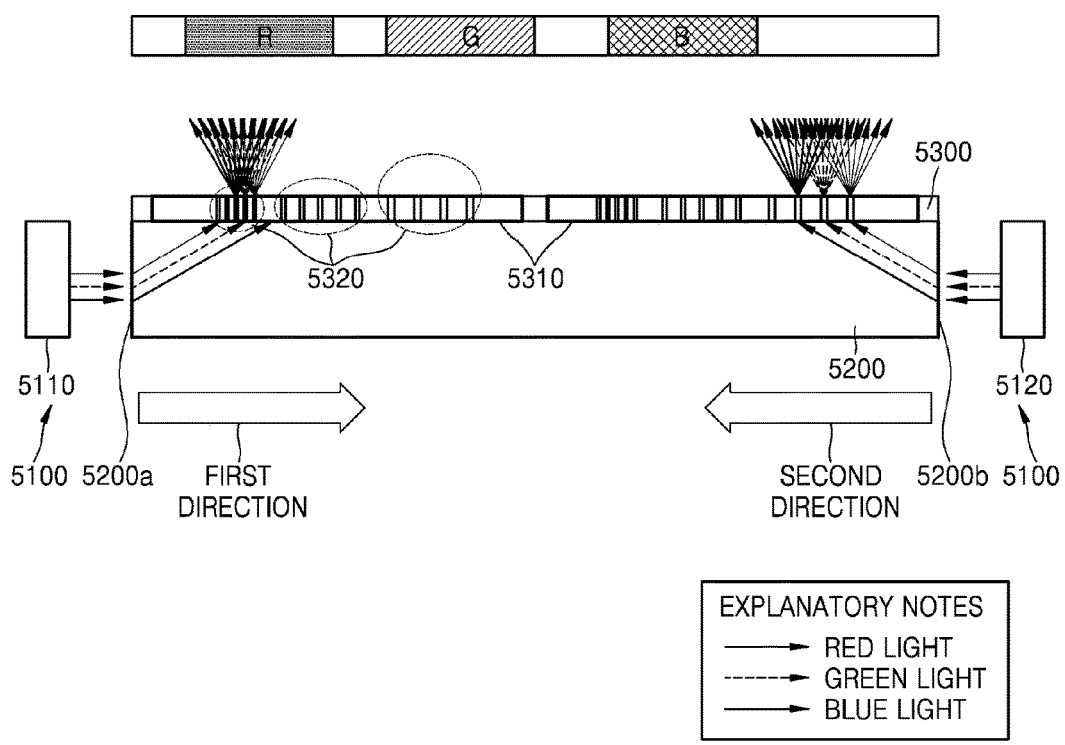
FIG. 7 is a schematic cross-sectional view of a directional backlight unit, according to another exemplary embodiment.
Figure 8:
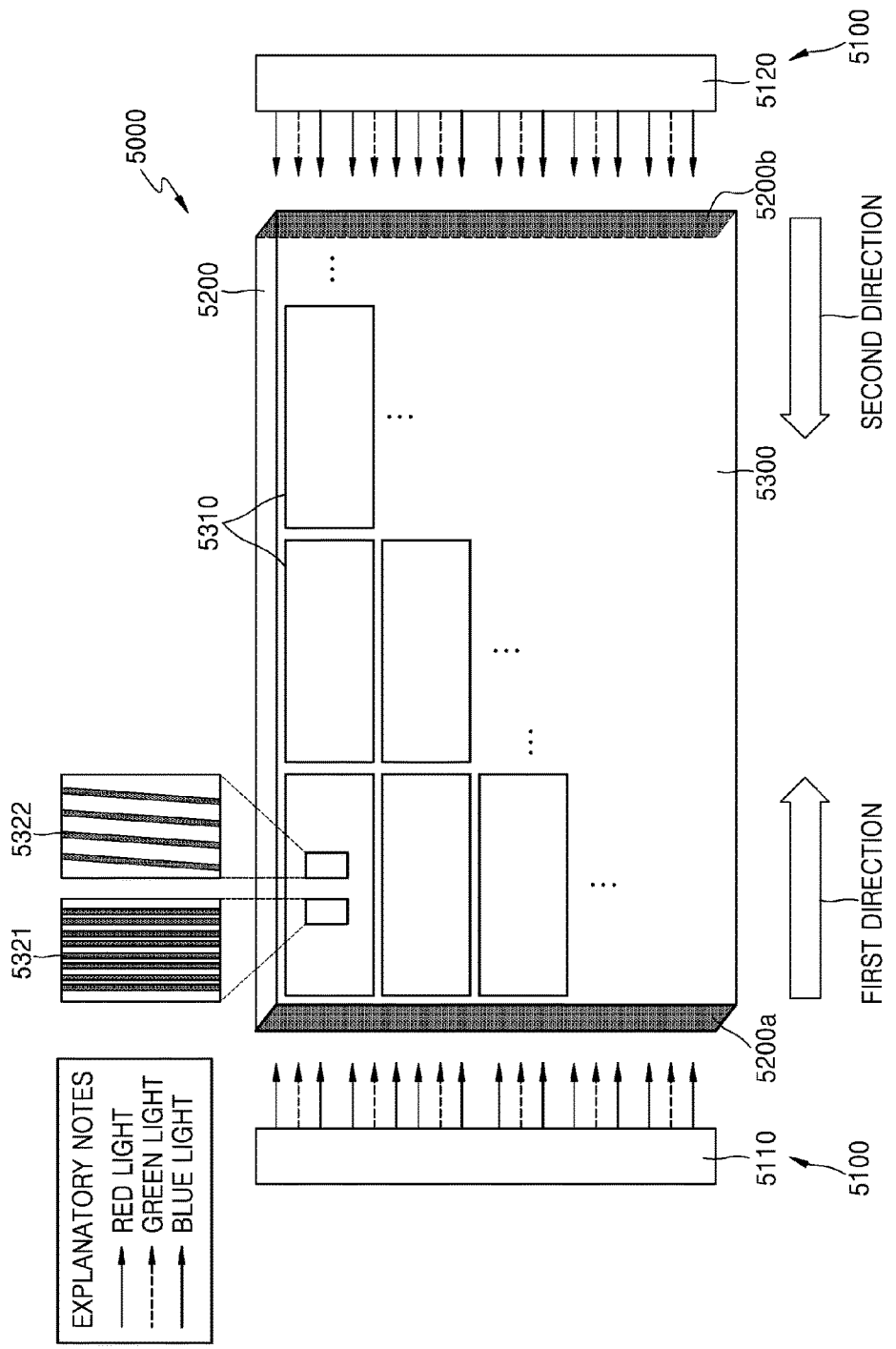
FIG. 8 is a schematic plan view of the directional backlight unit of FIG. 7.

FIG. 7 is a schematic cross-sectional view of a directional backlight unit 5000, according to another exemplary embodiment. FIG. 8 is a schematic plan view of the directional backlight unit 5000 of FIG. 7.

Referring to FIG. 7, a light source 5100 may include a first light source 5110 that is configured to irradiate a first incident surface 5200a of a light guide plate 5200 with color lights of a plurality of wavelengths in a first direction, and a second light source 5120 that is configured to irradiate a second incident surface 5200b of the light guide plate 5200 with color lights of the plurality of wavelengths in a second direction. The first and second directions may be opposite each other. The directional backlight unit 5000 according to the present exemplary embodiment irradiates the first and second incident surfaces 5200a and 5200b, which face each other, with color lights of the plurality of wavelengths, and thus, may be used in conjunction with a related art directional backlight unit in which uniformity decreases in a direction away from an incident surface.

As described above, the light guide plate 5200 may include two planar surfaces that face each other and a plurality of side surfaces that face each other and connect the two planar surfaces, wherein the plurality of side surfaces may include two long-side surfaces that face each other and two short-side surfaces that face each other. The first and second incident surfaces 5200a and 5200b may be located on the two short-side surfaces of the light guide plate 5200. A grating device 5300 may have a grating orientation that coincides with an arrangement direction of the light source 5100. For example, a grating 5310 may include sub-gratings 5321 and 5322 having respective grating orientations that are nearly perpendicular to the first and second directions.

Figure 9:
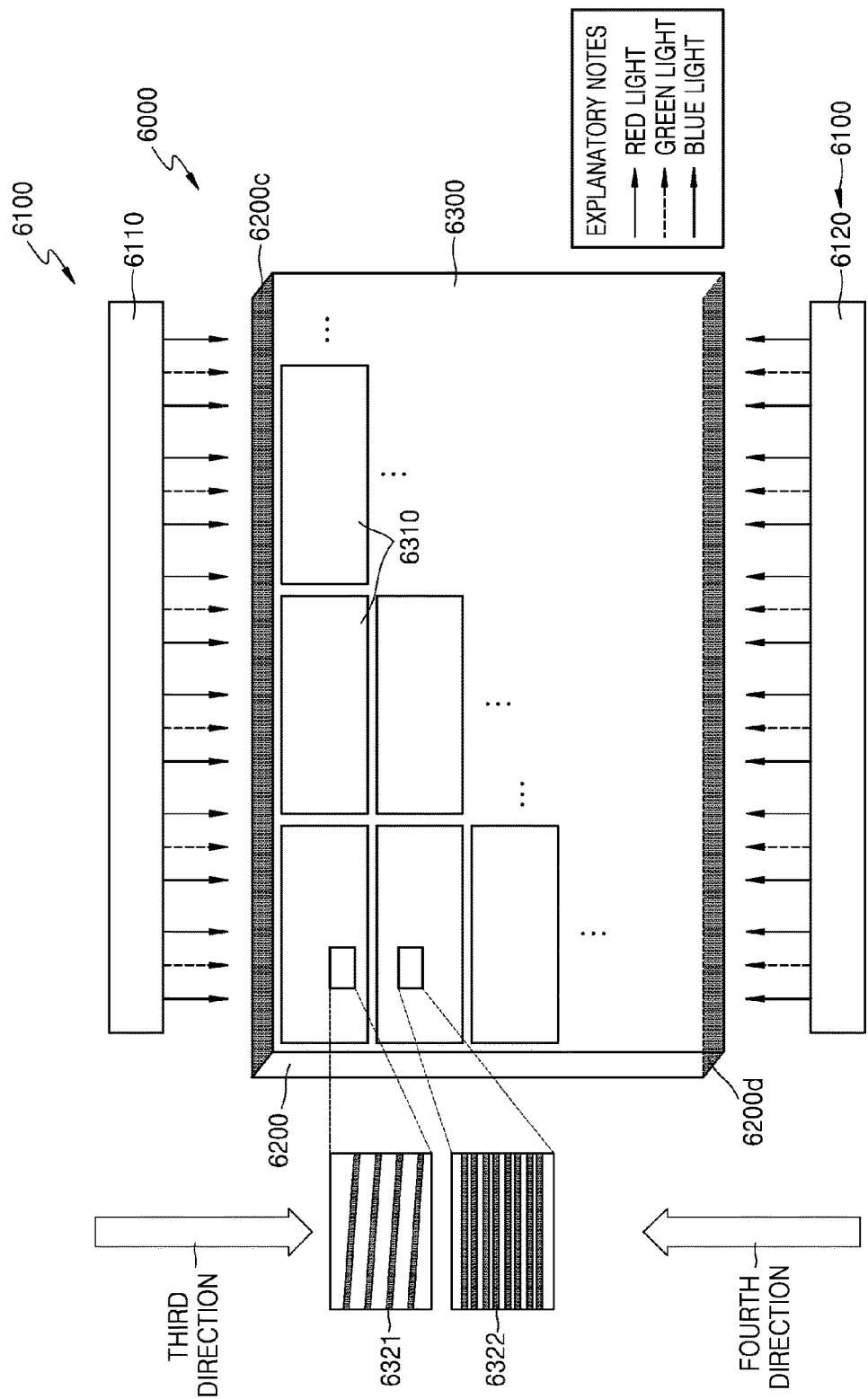
FIG. 9 is a schematic plan view of a directional backlight unit, according to another exemplary embodiment.

FIG. 9 is a schematic plan view of a directional backlight unit 6000, according to another exemplary embodiment. Referring to FIG. 9, a first light source 6110 and a second light source 6120 are located on the two long-side surfaces of a light guide plate 6200, respectively.

Figure 10:
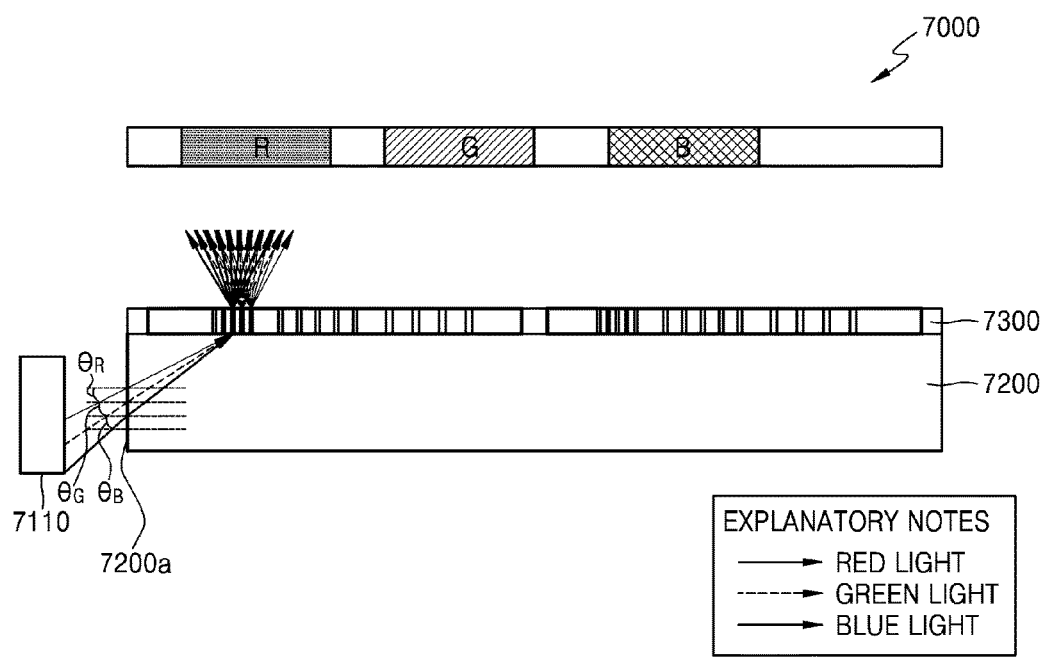
FIG. 10 is a schematic cross-sectional view of a directional backlight unit, according to another example embodiment.

A light source 6100 may include the first light source 6110 which is configured to irradiate a third incident surface 6200c of the light guide plate 6200 with color lights of a plurality of wavelengths in a third direction, and the second light source 6120 which is configured to irradiate a fourth incident surface 6200d of the light guide plate 6200 with color lights of a plurality of wavelengths in a fourth direction. Referring to FIG. 10, the third and fourth directions may be perpendicular to the first and second directions of FIG. 9.

A grating device 6300 may have a grating orientation that renders the grating device 6300 capable of interacting with all color lights of a plurality of wavelengths emitted from the third and fourth directions. For example, sub-gratings 6321 and 6322 may have respective grating orientations that are nearly perpendicular to the third and fourth directions. Since detailed descriptions are already described above, repeated descriptions thereof will not be given herein.

FIG. 10 is a schematic cross-sectional view of a directional backlight unit 7000, according to another exemplary embodiment. Referring to FIG. 10, incident angles of a plurality of color lights which are incident on an incident surface 7200a from a light source 7110 may be different from each other. Since the other components are substantially the same as those of the directional backlight unit of FIG. 2, repeated descriptions thereof will not be given herein.

In a directional backlight unit 7000 according to the present exemplary embodiment, the light source 7110 may irradiate the incident surface 7200a with color lights at different incident angles, respectively.

For example, a red light may be incident on the incident surface 7200a to have an incident angle of $\theta_R$, a green light may be incident on the incident surface 7200a to have an incident angle of $\theta_G$, and a blue light may be incident on the incident surface 7200a to have an incident angle of $\theta_B$, based on a vertical direction of the incident surface 7200a. $\theta_R$, $\theta_G$, and $\theta_B$ may be the same as or different from each other.

As described above, incident angles of color lights with respect to the incident surface 7200a may have a predetermined correspondence relation to emission directions of color lights emitted from the grating device 7300. Therefore, even in the same grating device 7300, the directional backlight unit 7000 may adjust emission directions of color lights emitted from the grating device 7300 by adjusting the incident angles $\theta_R$, $\theta_G$, and $\theta_B$ within a predetermined range. According to an experiment, emission directions of color lights may be adjusted by adjusting the incident angles $\theta_R$, $\theta_G$, and $\theta_B$ within a range of ±30°.

Figure 11:
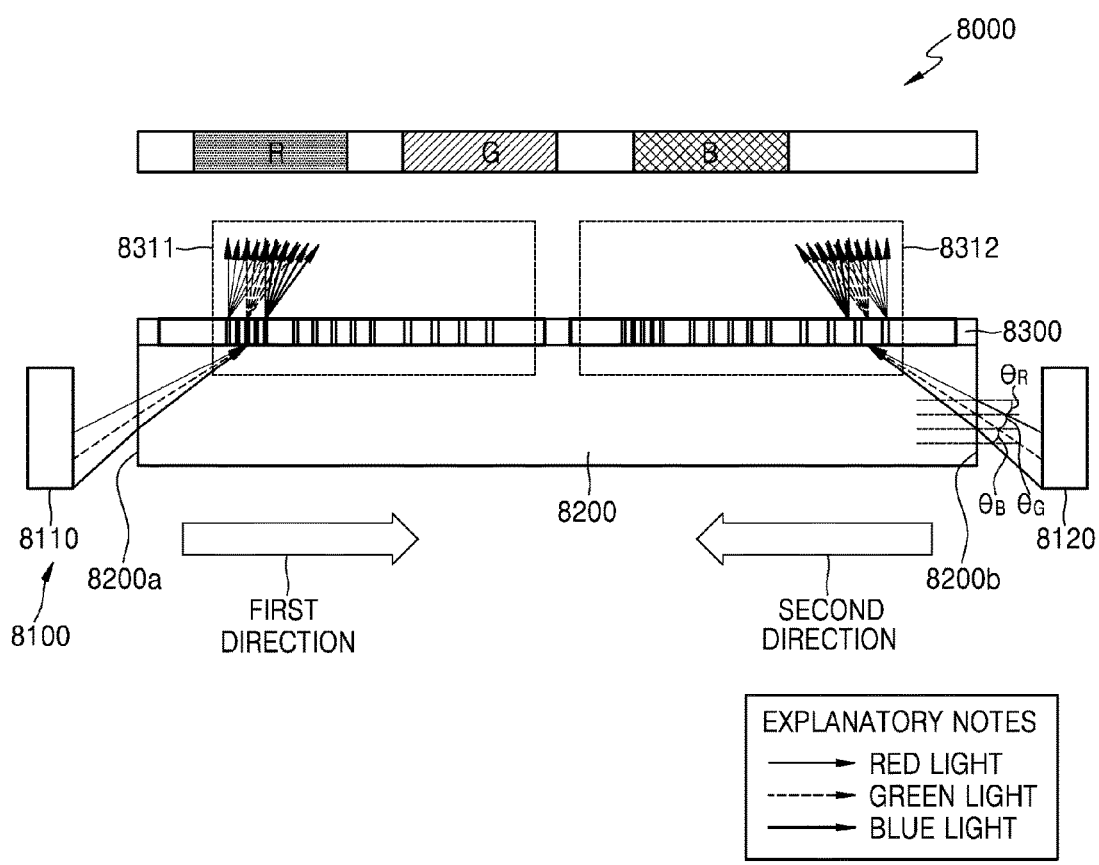
FIG. 11 is a schematic cross-sectional view of a directional backlight unit according to another exemplary embodiment.

FIG. 11 is a schematic cross-sectional view of a directional backlight unit 8000, according to another exemplary embodiment. Referring to FIG. 11, a light source 8100 may include a first light source 8110 which is configured to irradiate a first incident surface 8200a of a light guide plate 8200 with color lights of a plurality of wavelengths in a first direction at different incident angles, and a second light source 8120 which is configured to irradiate a second incident surface 8200b of the light guide plate 8200 with color lights of a plurality of wavelengths in a second direction at different incident angles. The first and second directions may be opposite each other.

A grating device 8300 according to the present exemplary embodiment may include one of gratings 8311 and 8312 that are different from each other, based on a position of the light guide plate 8200. For example, a first grating 8311 may emit a plurality of color lights in a first direction, and a second grating 8312 may emit a plurality of color lights in a second direction. The first grating 8311 may be adjacent to a first incident surface 8200a, and the second grating 8312 may be adjacent to a second incident surface 8200b. The grating device 8300 may improve a brightness of the directional backlight unit 8000 by preventing a loss of light to the outside of the directional backlight unit 8000.

However, the first and second gratings 8311 and 8312 are not limited thereto. Furthermore, the grating device 8300 includes gratings so that emission directions of color lights may vary with a position of each of the gratings and may adjust various emission directions of light.

Figure 12:
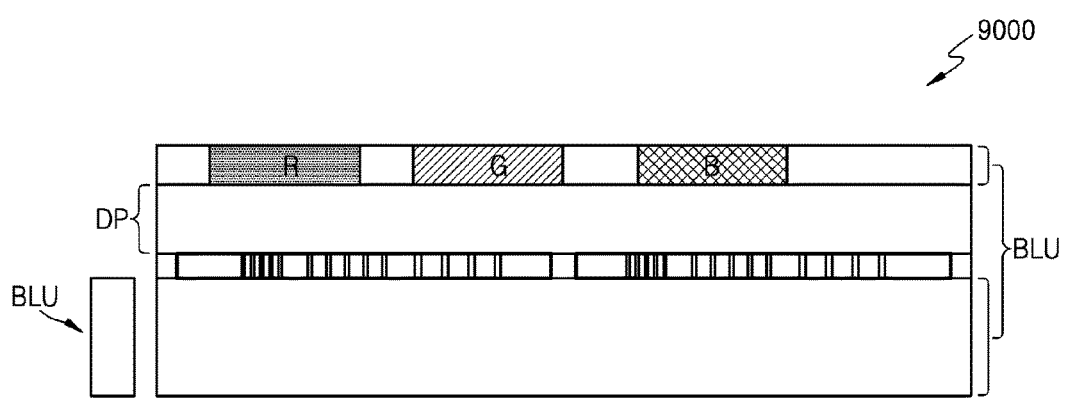
FIG. 12 is a schematic cross-sectional view of a three-dimensional (3D) image display device, according to an exemplary embodiment.

FIG. 12 is a schematic cross-sectional view of a 3D image display device 9000, according to an exemplary embodiment.

The 3D image display device 9000 may include a directional backlight unit BLU and a display panel DP according to the exemplary embodiment described above. Repeated descriptions of the directional backlight unit BLU are omitted here.

The display panel DP may include, for example, a liquid crystal display. The display panel may include, for example, a plurality of pixels arranged in a matrix structure, and the plurality of pixels may include sub-pixels that respectively correspond to light of each color. The sub pixels in the display panel DP may correspond to the sub color filter pixels 1410, 1420, and 1430 of the color filter 1400 (as illustrated in FIG. 1).

For example, a 3D image display device may display twenty (20) views. Here, a view may denote a single image viewed on a single eye of a viewer. However, the view is not limited thereto, that is, it is possible that more than two views are displayed on a single eye of the viewer. For example, referring to FIG. 1, when a 3D image display device displays 20 views, the grating device 1300 may include the plurality of sub-gratings 1320 that corresponds to the 20 views in each of the plurality of gratings 1310. For example, again referring to FIG. 1, when a 3D image display device displays 96 views, the grating device 1300 may include the plurality of sub-gratings 1320 that corresponds to the 96 views in each of the plurality of gratings 1310.

Figure 13:
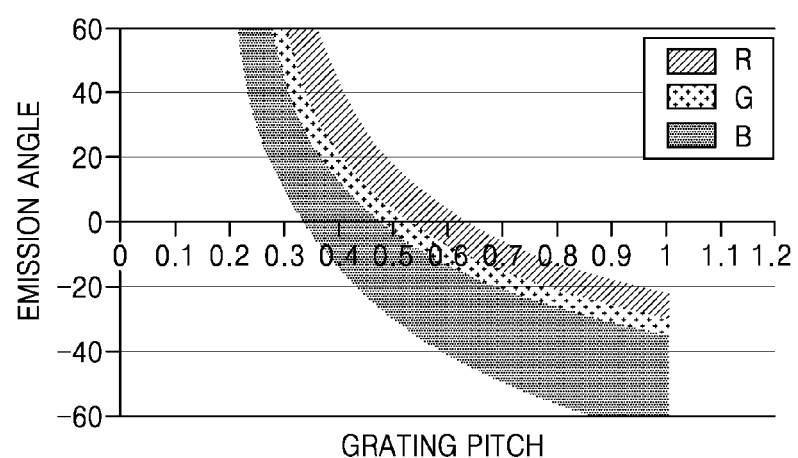
FIG. 13 is a graph illustrating simulation results regarding an emission angle according to a grating pitch.

FIG. 13 is a graph illustrating simulation results regarding an emission angle according to a grating pitch. Referring to FIG. 13, an x-axis indicates a grating pitch, and a y-axis indicates an emission angle (°).

Regarding a red light, a grating pitch of about 0.5 degrees is required in order to obtain an emission angle of +20°, and a grating pitch of about 0.8 degrees is required in order to obtain an emission angle of −20°. Regarding a green light, a grating pitch of about 0.4 degrees is required in order to obtain an emission angle of +20°, and a grating pitch of about 0.7 degrees is required in order to obtain an emission angle of −20°. Regarding a blue light, a grating pitch of about 0.3 degrees is required in order to obtain an emission angle of +20°, and a grating pitch of 0.4 degrees is required in order to obtain an emission angle of −20°.

According to an exemplary embodiment, a grating pitch of a grating may be as shown in FIG. 13. FIG. 13 shows simulation results regarding color lights per wavelength, and an emission angle may be adjusted according to the grating pitch.

Figure 14:
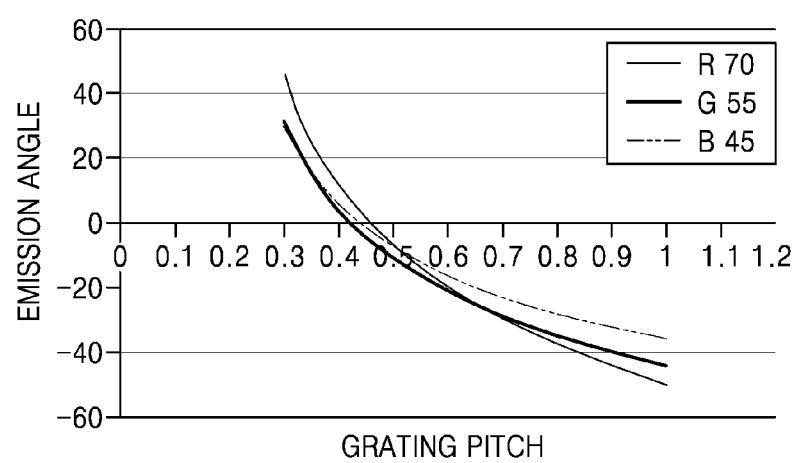
FIG. 14 is a graph illustrating simulation results regarding an emission angle according to a grating pitch and an incident angle.

FIG. 14 is a graph illustrating simulation results regarding an emission angle according to a grating pitch and an incident angle. Referring to FIG. 14, an x-axis indicates a grating pitch, and a y-axis indicates an emission angle (°).

Referring to FIG. 14, if a red light is incident on an incident surface at 70 degrees, a green light is incident on an incident surface at 55 degrees, and a blue light is incident on an incident surface at 45 degrees, a relationship between an emission angle per wavelength and a grating pitch may be similar to each other. A single grating pitch may correspond to a single emission angle by adjusting an angle of an incident light per wavelength, and thus, a grating may be easily designed. For example, when a grating pitch of a grating is 0.45, an emission angle of each of a red light, a green light, and a blue light may be close to 0 degrees if the red light is incident on an incident surface at 70 degrees, the green light is incident on an incident surface at 55 degrees, and the blue light is incident on an incident surface at 45 degrees.

According to the above-described exemplary embodiments, a directional backlight unit may improve light uniformity. The directional backlight unit may irradiate an incident surface of the directional backlight unit with a plurality of color lights in an identical direction, and all grating patterns of the directional backlight unit may react to the plurality of color lights. Therefore, a directional backlight unit may improve total brightness and uniformity because respective grating patterns for wavelengths of color lights are not required. According to the exemplary embodiments, a 3D image display device having high image quality may be provided by using a directional backlight unit.

To promote understanding of one or more exemplary embodiments, a directional backlight unit and a 3D image display device having the same are described above with respect to exemplary embodiments, examples of which are illustrated in the accompanying drawings. It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A directional backlight unit comprising:
a light guide plate;
a light source configured to radiate a plurality of color lights toward an incident surface of the light guide plate;
a plurality of gratings configured to emit the plurality of color lights radiated toward the light guide plate; and
a color filter comprising a plurality of color filter pixels that respectively correspond to the plurality of color lights emitted from the plurality of gratings, wherein each of the plurality of gratings comprises a plurality of sub-gratings, and the plurality of sub-gratings are configured to react to the plurality of color lights,
wherein the directional backlight unit is configured to satisfy the following formula:

$$N_{cfp} \leq N_{gu-i} * N_{sgu-i} * N_l$$

where $N_{cfp}$ is a total number of color filter pixels included in the color filter, $N_{gu-i}$ is a total number of the plurality of gratings, $N_{sgu-i}$ is a total number of the plurality of sub-gratings in the grating corresponding to index i, and $N_l$ is a number of wavelengths of the plurality of color lights emitted from the light source.

2. The directional backlight unit of claim 1, wherein the incident surface of the light guide plate is formed only on one side of the light guide plate.

3. The directional backlight unit of claim 1, wherein the light source comprises a first light source configured to emit a plurality of color lights and a second light source configured to emit the plurality of color lights, and
the incident surface of the light guide plate comprises a first incident surface on which the plurality of color lights from the first light source are incident, and a second incident surface on which the plurality of color lights from the second light source are incident.

4. The directional backlight unit of claim 3, wherein the first incident surface is formed on a first side of the light guide plate, and the second incident surface is formed on a second side of the light guide plate which is opposite the first side of the guide plate, and
the first incident surface is disposed to face the second incident surface.

5. The directional backlight unit of claim 4, wherein the plurality of gratings comprises a plurality of first gratings configured to emit the plurality of color lights in a first direction, and a plurality of second gratings configured to emit the plurality of color lights in a second direction, and
the first gratings are adjacent to the first incident surface, and the second gratings are adjacent to the second incident surface.

6. The directional backlight unit of claim 4, wherein the light guide plate comprises two planar surfaces that face each other, two long-side surfaces that face each other and connect the two planar surfaces, and two short-side surfaces that face each other and connect the two planar surfaces, and the first incident surface is formed on a first one of the two short-side surfaces, and the second incident surface is formed on a second one of the two short-side surfaces.

7. The directional backlight unit of claim 4, wherein the light guide plate comprises two planar surfaces that face each other, two long-side surfaces that face each other and connect the two planar surfaces, and two short-side surfaces that face each other and connect the two planar surfaces, and the first incident surface is formed on a first one of the two long-side surfaces, and the second incident surface is formed on a second one of the two long-side surfaces.

8. The directional backlight unit of claim 1, wherein each of the plurality of gratings has an identical sub-grating arrangement.

9. The directional backlight unit of claim 1, wherein each of the plurality of sub-gratings has a substantially vertical grating orientation with respect to the plurality of color lights.

10. The directional backlight unit of claim 1, wherein each of the plurality of sub-gratings has a substantially parallel grating orientation.

11. The directional backlight unit of claim 1, wherein at least one of the plurality of sub-gratings has at least one of a grating pitch, a grating width, and a grating duty cycle that is different from the at least one of the grating pitch, the grating width, and a grating duty cycle of other sub-gratings.

12. The directional backlight unit of claim 1, wherein the light source is configured to irradiate the plurality of color lights toward the incident surface at different incident angles.

13. The directional backlight unit of claim 1, wherein each of the plurality of sub-gratings includes a grating pattern which is configured to adjust respective emission angles of the plurality of color lights by adjusting a grating pitch.

14. The directional backlight unit of claim 13, wherein the grating pattern includes one from among a linear grating, a curved grating, a pole-type grating, and a gradient grating.

15. The directional backlight unit of claim 1, wherein each of the gratings comprises at least one from among a high-molecular material, silicon nitride (SiN), and silicon oxide (SiO2).

16. The directional backlight unit of claim 1, wherein at least two positions of the plurality of color filter pixels correspond to at least two of the plurality of color lights emitted from the plurality of gratings and the plurality of sub-gratings.

17. The directional backlight unit of claim 1, wherein at least two of the plurality of sub-gratings are adjacent to each other.

18. The directional backlight unit of claim 1,
wherein a total number of the plurality of color lights transmitted by the color filter is less than a total number of the plurality of color lights emitted from the plurality of gratings.

19. A three-dimensional (3D) image display device comprising:
a directional backlight unit comprising: a light guide plate; a light source configured to radiate a plurality of color lights toward an incident surface of the light guide plate; a plurality of gratings configured to emit the plurality of color lights radiated toward the light guide plate; and a color filter comprising a plurality of color filter pixels that respectively correspond to the plurality of color lights emitted from the plurality of gratings; and a display panel configured to form an image by using the plurality of color lights emitted from the directional backlight unit, wherein each of the plurality of gratings comprises a plurality of sub-gratings, and each of the plurality of sub-gratings is configured to react to the plurality of color lights wherein the directional backlight unit is configured to satisfy the following formula:

$$N_{cfp} \leq N_{gu-i} * N_{sgu-i} * N_l$$

where $N_{cfp}$ is a total number of color filter pixels included in the color filter, $N_{gu-i}$ is a total number of the plurality of gratings, $N_{sgu-i}$ is a total number of the plurality of sub-gratings in the grating corresponding to index i, and $N_l$ is a number of wavelengths of the plurality of color lights emitted from the light source.

* * * * *